United States Patent [19]

Asanuma et al.

[11] Patent Number: 5,064,496
[45] Date of Patent: Nov. 12, 1991

[54] METHODS FOR COLLECTING AND LOADING YARNS AND APPARATUSES THEREFOR

[75] Inventors: Akira Asanuma, Iwakuni; Tomonori Shida, Kobe, both of Japan

[73] Assignee: Teijin Limited, Osaka, Japan

[21] Appl. No.: 416,316

[22] PCT Filed: Mar. 30, 1988

[86] PCT No.: PCT/JP88/00317
§ 371 Date: Sep. 27, 1989
§ 102(e) Date: Jul. 27, 1989

[30] Foreign Application Priority Data

Mar. 30, 1987 [JP] Japan ................... 62-74454

[51] Int. Cl.$^5$ .................................. B32B 31/00
[52] U.S. Cl. .................. 156/468; 156/441; 156/433; 156/166
[58] Field of Search ........... 156/166, 433, 441, 468; 19/150, 0.56, 0.39

[56] References Cited

U.S. PATENT DOCUMENTS

| | | | |
|---|---|---|---|
| 3,120,690 | 2/1964 | Stevens | 156/441 |
| 4,061,574 | 12/1977 | Clark | 210/321.9 |
| 4,224,094 | 9/1980 | Amicel et al. | 156/433 |
| 4,842,620 | 6/1989 | Hammel et al. | 55/16 |

FOREIGN PATENT DOCUMENTS

| | | |
|---|---|---|
| 47-15548 | 5/1972 | Japan . |
| 60-54711 | 3/1985 | Japan . |
| 60-80463 | 5/1985 | Japan . |
| 61-86906 | 5/1986 | Japan . |
| 62-171710 | 7/1987 | Japan . |

*Primary Examiner*—Richard Bueker
*Assistant Examiner*—Robert Barker
*Attorney, Agent, or Firm*—Sughrue, Mion, Zinn, Macpeak & Seas

[57] ABSTRACT

A method for collecting yarns and an apparatus therefor which are characterized by that yarns of a plurality of fibrous materials are held and collected by a running belt a part of which is made round into a cylindrical form, run at this state for a prescribed distance together with the belt, and are released from the belt in the collected form, and a method for loading a bundle of yarns and an apparatus therefor which are characterized by that a cylinder tool which is provided with a ring whose inner diameter is expanded toward the top at one end of the tool is inserted into a cylindrical case, the bundle of yarns is loaded into the cylinder tool from the one end until the top end of the bundle is exposed to the other end of the case, then, the top part of the bundle and the case are held, and the cylinder tool is removed off toward the one end, as the bundle is allowed to remain in the case.

12 Claims, 2 Drawing Sheets

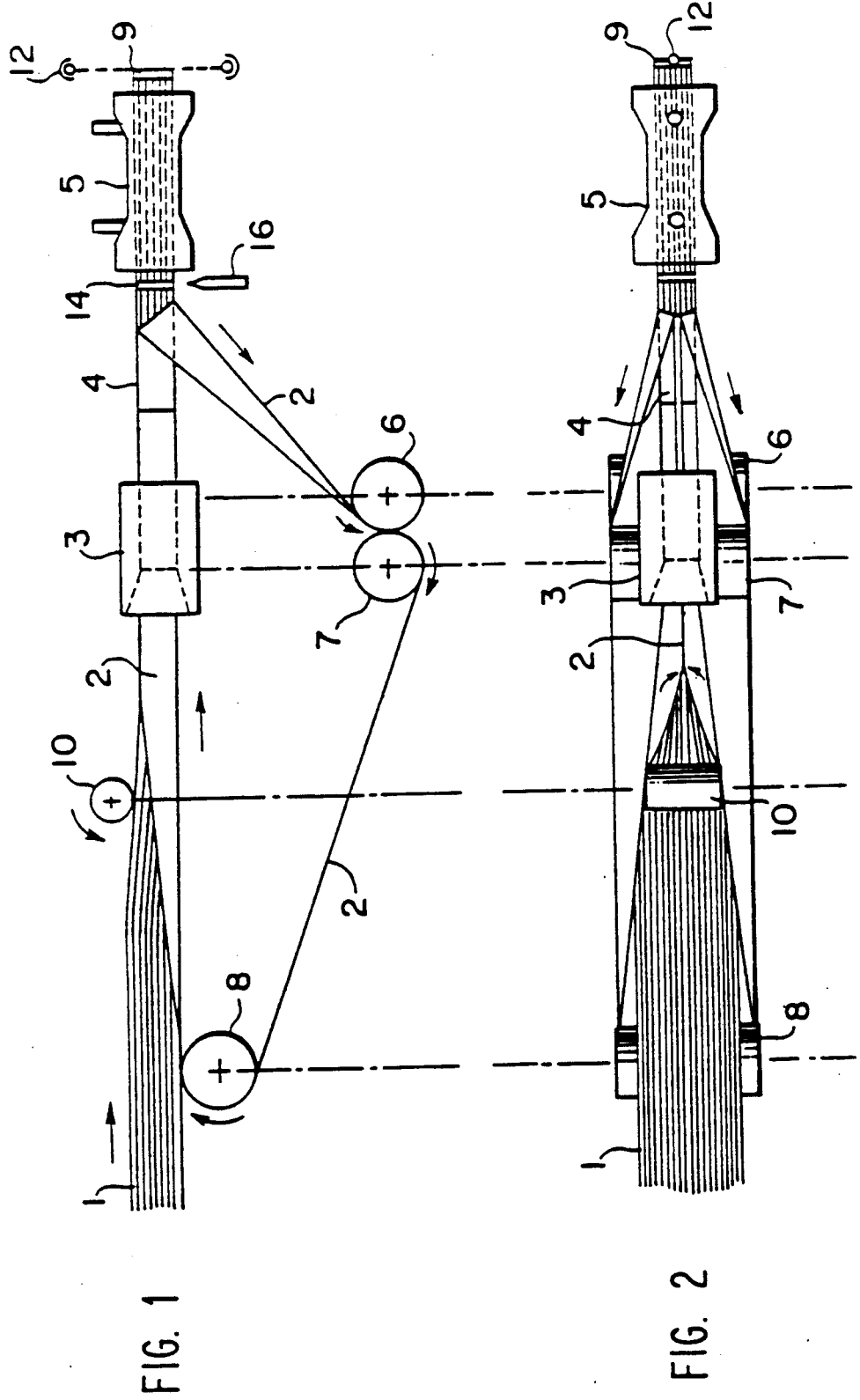

METHODS FOR COLLECTING AND LOADING YARNS AND APPARATUSES THEREFOR

FIELDS OF THE ART

The present invention relates to methods for collecting yarns comprising a plurality of fibrous substances more densely and loading the collected yarns into a cylindrical case, and apparatuses therefor. Particularly, the present invention relates to improved methods for collecting hollow fibers, and loading them into a cylindrical case and apparatuses therefor, which are suitable for producing a hollow fiber type of separatory apparatus suitable for fluid separation.

BACKGROUND OF THE ART

In fluid separation apparatuses, there are several types of membrane forms for fluid separation, for example, plane membranes, tubes, hollow fibers, etc. Among them, hollow fibers have a large membrane area for the size of the case, thus the fluid separation apparatuses therefrom can be advantageously made compact and easy to be operated. Today this type of the fluid separation apparatuses are primarily used.

The process for producing fluid separation apparatuses of a hollow fiber type comprises (1) forming a bundle of hollow fibers of a prescribed count, (2) loading the yarn bundle into a cylindrical case, for example, a plastic case, (3) potting the bundle of hollow fibers to both ends of the case with a resin such as polyurethane, (4) exposing fiber openings by cutting both potted ends of the bundle and (5) fixing the product to the headers.

Collection of hollow fibers into a bundle and encasement thereof have been mainly performed manually conventionally, thus the quality of the products tends to vary too widely, and the production efficiency remains low, thus, the development of a new efficient production method has been desired eagerly.

In the production of a bundle of hollow fibers of a prescribed count, the total cross-section of the bundle is generally formed into a flat, round or square shape, depending on the cases, and the cross section of the bundle is required to be almost the same as the inner cross section of the case, and the sizes of the cross section, namely the diameter, if the cross section is round, or the major and minor axes, if elliptical, or the length and width, if rectangular, should be the same as or just a little smaller than those of the case, when a bundle is loaded into the case.

When it satisfies these conditions, the bundle of yarn fibers formed can be readily loaded into the case, but, if not, the shape of its cross-section should be modified.

Heretofore, it has been ordinary that the shape modification of the cross section is mainly performed manually because of the difficulty of the modification of the cross section by an apparatus. In addition, the bundle of hollow fibers which has been modified by hand is usually loaded into the case by hand carefully and slowly. Such handiwork, however, must largely rely on the art of each worker, resulting in fluctuations in the product quality as well as the productivity. The present invention is to resolve these problems.

Moreover, with reference to the production of a fluid separation apparatus of a hollow fiber type such as a hemodialyzer, one of conventional methods for loading a bundle of permselective hollow fibers into the cylindrical case of a fluid separator comprises binding each bundle of hollow fibers with a tape at both ends and pushing one end of the bundle forcibly by hand into the case, or connecting a string through the cylindrical case to one end of the yarn bundle and pulling the other end of the string to introduce the bundle into the case.

In these conventional methods, a skilled worker is required to adjust the form of the fiber bundles by hand for inserting them into the cylindrical case one by one carefully, and such low efficiencies of these operations have been the bottle neck for efficient production of the fluid separation apparatuses of a hollow fiber type with productivity increased. In addition, the friction with the wall surface on the insertion tends to disturb the parallelism of the hollow fibers, and sometimes causes deterioration such as breakage of the hollow fibers, which results in lower productivity of such fluid separators.

Recently, for example, Japanese Patent Laid-open No. 54711/1985 has proposed a method that the bundle of hollow fibers is previously wrapped with a sheet so that one end of the bundle is hidden, while the other exposed, then inserted into one opening of the case from the hidden end and only the sheet is pulled out of the other opening, and Japanese Patent Laid-open No. 86,906/1986 has disclosed a method that the bundle of hollow fibers is previously wrapped with a cylindrical bag to which a string is attached at one end so that the other end of the string contacts one end of the hollow fiber bundle, and loaded into the outer case by introducing the wrapped bundle from the end to which the string is attached into the protection cylinder case and pulling off the cylindrical bag by drawing the string. The preliminary operation to wrap the hollow fiber bundle, however, are very complicated, in particular, the process tends to become complicated, when the bundle is loaded into a cylindrical case by an automated system. Thus, further improvement has been desired.

DISCLOSURE OF THE INVENTION

An object of the present invention is to provide improved methods for collecting a bundle of fiber yarns and an apparatus therefor which overcome these conventional defects, with production efficiency and stability increased. Particularly, an object of the present invention is to improve the method for collecting a bundle of hollow fibers, comprising one step of the process for producing fluid separation apparatuses of a hollow fiber type where highdensity loading of the bundle is required.

Another object of the present invention is to enable the production of fluid separation apparatuses of a hollow fiber type in stabilized and increased productivity by optimizing the process for loading a bundle of hollow fibers into a cylindrical case for automation.

The inventors have made an intensified investigation to achieve such objects and reached the yarn-collecting method and apparatuses therefor of this invention by finding that it is very effective to hold said yarns with an endless belt means.

In addition, the present inventors have found that a bundle of hollow fibers can be loaded into a cylindrical case efficiently and stably without any adverse effect on the bundle, by inserting previously a cylinder tool having a tapered open ring at one end into the cylindrical case first, then loading the bundle of said yarns from the tapered opening through the cylinder tool into the case, and thus, reached the loading method and apparatuses therefor of this invention.

In other words, the present invention comprises the following:

A method of collecting yarns in a form of a bundle which is characterized by the following steps in combination, holding said yarns by a running belt means a part of which is made round into a cylindrical form by closing tight, moving said yarns with the belt means for a predetermined distance while being held by the belt means, and then releasing said yarns from the belt means;

An apparatus for collecting yarns in the form of a bundle, which comprises a means for feeding said yarns, and a belt means which is capable of holding said yarns by being made into a cylindrical form, moving with said yarns for a predetermined distance while holding said yarns and then releasing said yarns;

A method of loading a bundle of yarns into a cylindrical case which is characterized by following steps in combination, inserting a cylinder tool having a ring having an inner diameter which is expanded toward the top of the ring at one end of the cylinder tool into the cylindrical case, loading the bundle of yarns into the cylinder tool from said one end until the end of the bundle is exposed at the other end of the tool, holding both the exposed end of the bundle and the cylindrical case, and then extracting the cylinder tool toward said one end of the tool as the bundle is allowed to remain in the cylindrical case; and An apparatus for loading a bundle of yarns which comprises a means for feeding a bundle of yarns whose at least one end is wound with a taping material, a means for fixing a cylinder tool having a ring whose inner diameter is expanded toward the top of the ring at one end of the tool, a means for holding and transferring the cylindrical case, and a means for holding the end of the yarn bundle and transferring the bundle, and a means for controlling a series of the following operations: putting the cylindrical case on the cylinder tool from the other end of the tool, inserting the bundle of yarns into the tool from said one end of the tool, until the end of the bundle is exposed to the other end of the tool, then, the end of the bundle is held and the case and the bundle are simultaneously moved toward the other end of the tool.

BRIEF DESCRIPTION OF THE DRAWINGS

FIGS. 1 and 2 schematically show the outline of a preferable embodiment of a means for collecting yarns according to the present invention.

FIG. 1 is a front view, while FIG. 2 is a plane view of the apparatus. In these figures, 1 is a bundle of hollow fibers, 2 is the endless belt means, 3 is a belt-rounding jig means, 4 is a collecting nozzle means, 5 is a cylindrical case, and 6,7 and 8 are rollers driving the endless belt means. 9 represents one end of a bundle of hollow fibers.

FIG. 3 is an outline of the cylinder tool itself, FIG. 4 is an outlined cross-section where the cylindrical case is put on the cylinder tool, FIG. 5 is an outlined cross-section where the bundle of hollow fibers is loaded into the case, and FIG. 6 shows a state where one end of the bundle of hollow fibers and the cylindrical case are held.

Figure 3:
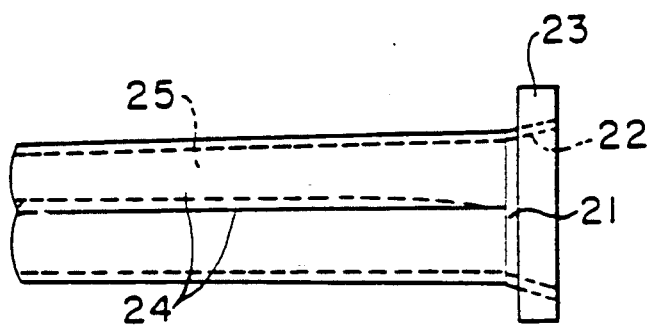
FIGS. 3 through 6 show schematically a preferable embodiment of each step of a process for loading a bundle of yarns according to the present invention.

In these Figures, 21 is a ring having tapered opening, 22 is the inner surface, 23 is a supporter, 24 is the part to be cut, 25 is a sleeve, 26 is the cylindrical case, 27 is the bundle of hollow fibers, 28 is an adhesive tape and 29 and 30 are holding means. The best embodiment for carrying out the invention is set forth below.

FIG. 1 is a front view showing the structure of a yarn-collecting apparatus which is an embodiment of this invention, while FIG. 2 is a plane view showing the state where a bundle of hollow fibers is suitably collected by means of an endless belt means 2, a belt-rounding jig means 3 and a collecting nozzle means 4 into an almost appropriate shape and loaded into the case 5. The endless belt means 2 is driven by rollers 6, 7 or 8. The arrows in the Figures indicate the moving directions of the bundle of hollow fibers, the belt means or rollers.

In other words, a bundle of hollow fibers 1 is extended in almost parallel preliminarily and fed to the apparatus according to the invention, in which said yarns are collected into a bundle of yarns more densely, as it runs with the endless belt means 2 while being held with the belt means a part of which is made round into a cylindrical form by the belt-rounding jig means 3.

At the start, the bundle of hollow fibers 1 may be fed near the belt-rounding jig means 3 by holding it with a robot (not shown in the Figure), or it is also possible to install a belt conveyer (not shown in the Figure) which runs at the same speed as the endless belt means does, behind the roller 8, and drives it synchronously with the roller 8.

In some cases, the bundle of yarns 1 rises, as it is collected from a wide form to a dense and narrow form, until it expands over from the overlapped belt edges. In such a case, the expansion can be prevented by placing a roller or a guide 10 on the position to press the expansion of the bundle of said yarns 1.

The endless belt means 2 is made round into a cylindrical form, just like a layer sheet in a rolled "SUSHI", after it passes through the belt-rounding jig means 3.

The bundle of hollow fibers 1 is collected by the belt-rounding jig means 3 and shaped into the finally right cross-sectional form by the collecting nozzle means 4, then loaded into the case 5 which is located in front of the bundle in this situation. It is a matter of course that the shape of the collecting nozzle means 4 should be designed accurately to the inner cross section of the case 5. The belt-rounding jig means 3 may be integrated with the collecting nozzle means 4, or the belt-rounding jig means 3 can also work as a collecting nozzle means 4 or vise versa.

The bundle of hollow fibers 1 loaded in the case 5 is cut with a cutter such as a knife in an appropriate length, by allowing the endless belt means 2 to stop tentatively, when the top of the bundle 9 comes to a prescribed position, and binding the bundle 1 with an adhesive tape 14 or the like at a predetermined position between the collecting nozzle means 4 and the case 5, so that the adhesive tape 14 is left at both ends after cutting. The endless belt means 2 is tentatively stopped by, for example, using a switch equipped with a light detector 12 at the top end 9. After completion of cutting, the case into which the bundle of hollow fibers has been loaded is removed and a new empty case is set to the position and the next operations can be repeated automatically.

When the endless belt means 2 is made round into a cylindrical form by the jig means 3, the reversion of overlapped belt edges is undesirable during the operation, because a part of said yarns in the bundle are nipped and damaged by the endless belt means 3. In order to prevent such phenomena, guide pins may be set before and after the jig means 3 to make the overlap of the belt edges constant or the jib means 3 may be bored perpendicularly to the belt-running direction and pressurized air is introduced from the hole to make the overlap constant. The endless belt means 2 runs at such a state as the bundle of said yarns 1 is held with the endless belt means, and the bundle of said yarns 1 also runs at the same speed as the belt means 2 does resultantly.

The bundle of said yarns 1 goes to the collecting nozzle means 4, and the nozzle means 4 is required to have the outlet of an appropriate shape suitable for the bundle of hollow fibers 1 and the inner cross section of the case 5. The collecting nozzle means 4 can decide the final cross section of the bundle of hollow fibers 1, and allows the endless belt means 2 to turn to the side opposite to said yarns and unfold the belt means 2. Thus, the distance from the point where the bundle of hollow fibers is held with the endless belt means 2 to the point where the holding is released, is practically about 5 cm to about 200 cm, preferably 10 cm to 200 cm.

Any belt can be used in this invention as long as it suits the object of this invention, but in general, rubber belts or cloth belts can be preferably used. Examples of such belts are a cloth-layered rubber belt which has a structure in which a couple of cloth sheets coated with an adhesive rubber on both of their surfaces are laminated and covered with covering rubber sheets, respectively, a steel-code belt which is prepared by laminating covering rubber sheet onto both surfaces of a steel code layer, a rubber belt made of only rubber or a woven fabric belt which is prepared by coating or impregnating woven cloth with a resin, and a cloth-layered rubber belt, a woven fabric belt or the like is preferred. The material of the covering rubber sheets is not particularly limited, but natural rubber, isoprene rubber, butyl rubber, neoprene rubber, NBR, SBR, urethane rubber, or silicone rubber can be cited practically. Examples of resins for coating and impregnation are polyurethane, silicones or epoxide resins. The belt means for this invention is practically flat, 0.5 to 2 mm thick and 4 to 20 cm wide, and made endless into a ring.

The method for loading a bundle of yarns and an apparatus therefor of this invention are characterized by use of a cylinder tool which has a tapered opening ring whose diameter is expanded toward the end. A preferable embodiment of such a cylinder tool is shown in FIG. 3. In other words, the cylinder tool in FIG. 3 has, at one end, a ring 21 whose inner surface 22 is expanded toward the end, and has a supporter 23 for fixing the ring 21, further includes a substantially cylindrical sleeve 25 which is made by overlapping the cut edges 24 of a sheet and is tapered toward the opposite end of the ring 21.

A preferred example of the ring are a metallic ring which is made of stainless steel or aluminum whose inner surface is at least coated with a fluorine-containing resin such as polytetrafluoroethylene or a silicone resin or satin-finished to reduce the friction with the bundle of hollow fibers, or a plastic ring which is made of a fluorine-containing resin or the like. The sleeve is preferably made from a plastic sheet such as a fluorine-containing or olefin resin sheet and, may be embossed, if necessary, to reduce the friction with the bundle of hollow fibers.

Figure 4:
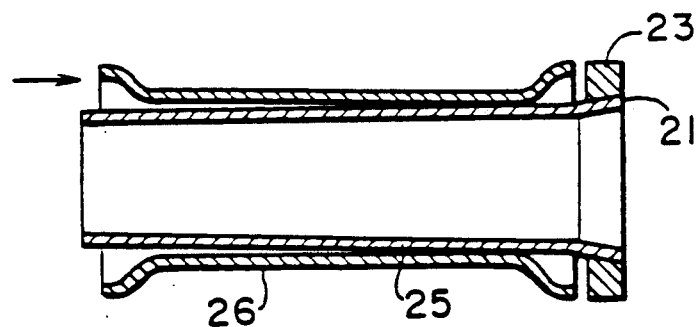
Figure 5:
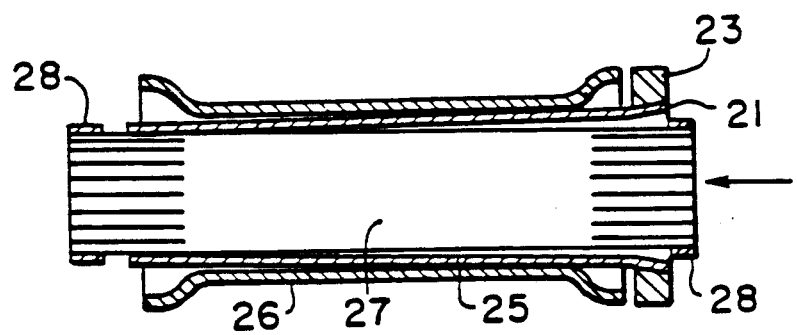

The method for loading of this invention is such that a cylinder tool is inserted into a cylindrical case for a fluid separation apparatus, a bundle of yarns such as a bundle of permselective-hollow fibers is loaded from the ring-equipped side into the inside of the cylinder tool, until the top end of the bundle of the yarns is exposed to the other end of the cylinder case. FIGS. 4 and 5 show these preferable embodiments. In other words, a cylindrical case 26 is put on the cylinder tool as shown in FIG. 3 equipped with a ring 21 and a sleeve 25 from the top of the sleeve, as shown in FIG. 4, then, a bundle of hollow fibers 27 which is bound with adhesive tapes 28 at both ends is loaded into the sleeve 25 from the side of the ring 21, as shown in FIG. 5. A long bundle of fibers which is wound with an adhesive tape only at the top end also may be loaded into the sleeve only at the head part. In this case, it is preferred that the bundle of said yarns is loaded into the case by a prescribed length, wound with an adhesive tape near the ring 21, and the loaded bundle is cut off with a knife or the like.

Figure 6:
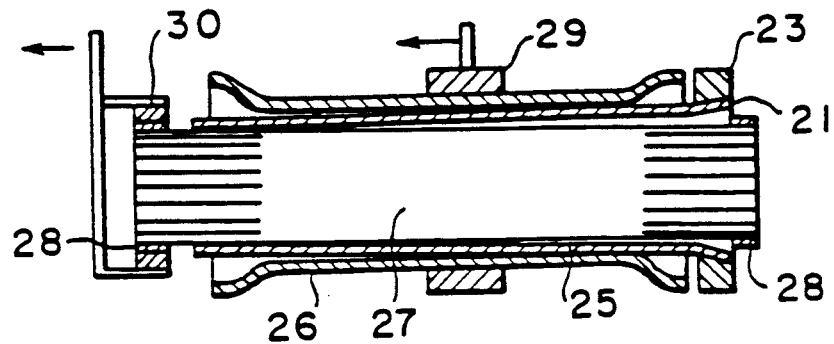

In addition, the loading method of this invention is such that the exposed part of the bundle of hollow fibers loaded into the case and the case are held and the cylinder tool is pulled off to the ring side, as the bundle is left in the case. The preferred embodiment is shown in FIG. 6. In other words, the product obtained by operations as shown in FIGS. 3 through 5 is supported by holding the case 26 with a holding means 29 and the exposed end of the hollow fiber bundle 27 with a holding means 30, respectively, and both of them are transferred at the same speed to the side of holding means 30 to pull out only the cylinder tool having a ring 21 which is fixed by a means for fixing and a sleeve 25 whereby a cylindrical case packed with a bundle of hollow fibers is obtained.

Thus, a bundle of permselective hollow fibers can be loaded into a cylindrical case stably and efficiently without damage to the bundle. The cylinder tool may be made movable, but the stationary installation is more suitable for automation, as shown in FIGS. 3 through 6, with productivity increased. In the loading method according to this invention, in case that the cylinder tool is fixed, automated loading becomes possible by combining the means for feeding a bundle of hollow fibers with a means for holding and transferring the cylindrical case as shown in FIGS. 1 and 2, and by providing a means for controlling each means to repeat a series of processes in order for putting the cylindrical case on the cylinder tool (FIG. 4), then loading a bundle of hollow fibers into a cylindrical case (FIG. 5), and transferring the case packed with the yarn bundle (FIG. 6).

Said yarns in this invention may be any kinds of fibrous materials of plural counts, however, a plurality of hollow fibers are more effective. Especially, examples of fibrous material which are preferably used in this invention are hollow fibers having permselectivity, which can be used in fluid separation such as liquid separation, for example, dialysis, reverse osmosis, ultrafiltration, or gas separation, for example, oxygen enrichment. The fibrous material also may be hollow fibers which are used as a support for forming permselective membranes by coating or the like. The hollow fibers particularly suitable for the present invention can be used in treatment for body fluid such as hemodialysis, blood filtration, plasma separation, ascites treatment or artificial lungs.

The material of such hollow fibers is not particularly limited, but cellulose, cellulose esters, polyethylene-vinyl alcohol copolymer, poly(methyl methacrylate) polysulfone, polyether sulfone, polyacrylonitrile and other polymers can be used in case of body fluid treatment.

The cross section of such hollow fibers is usually round, but it may be modified, for example, a finned shape or two lines of hollow fibers bonded to each other at their external periphery. Further, the hollow fibers may be crimped, or may be wound in spiral with other fine fibers.

The hollow fiber has an inner diameter 10 to 1,000 microns, preferably 20 to 300 microns, while its wall thickness is 3 to 300 microns, preferably 5–100 microns, particularly 6–30 microns.

The count of said yarns in this invention is 2,000 to 200,000, preferably 5,000 to 20,000, because the effect of this invention is advantageously manifested.

A fluid separation apparatus of a hollow fiber type can be produced more effectively and stably by the methods of this invention, and the fluid separation apparatus can be used in fluid treatment such as reverse osmosis, ultrafiltration or dialysis, or gas treatment such as oxygen enrichment or helium separation. Particularly, the methods of this invention enables easy loading of a bundle of hollow fibers stably with increased productivity, even in production of blood-treating apparatuses such as a hemodialyzer, blood filter, plasma separator or artificial lung in which the damage of hollow fibers must be avoided to the utmost.

POSSIBILITY OF INDUSTRIAL USE

The method for collecting a bundle of yarns and an apparatus therefor according to this invention can automatically collect a bundle of fibrous materials such as hollow fibers more densely, and can automatically repeat a series of operations of loading the bundle of said yarns into a case, stopping at an appropriate position and cutting the bundle of said yarns at a predetermined position, whereby a bundle of straightened yarns of almost equal length is readily obtained in a very high productive stability. Further, the operations of exchanging the case loaded with a bundle of hollow fibers with a new, empty case also can be automatically made.

The method for loading a bundle of yarns and an apparatus therefor according to this invention can load efficiently a bundle of permselective hollow fibers into a cylindrical case for a fluid separation apparatus without damage to the bundle, and, in particular, an automated system which can conduct the method of this invention enables loading of a bundle of hollow fibers in very high efficiency and increased productivity.

In other words, the present invention is an epochmaking, big stride of innovation to bring about a great labor saving in the production process, a great increase in productivity and a stabilization of quality.

We claim:

1. A method of collecting and forming yarns into a bundle, said yarns comprising 2,000 to 200,000 hollow fibers having a permselective wall, said method comprising:

holding said yarns by a running belt means;
forming a part of said belt means into a cylindrical shape by compressing said part of said belt means,
moving said yarns with the belt means for a predetermined distance while said yarns are held by the belt means,
releasing said yarns from the belt means,
loading a bundle of said yarns being released from said belt means into a cylindrical case,
stopping the running belt means,
binding the bundle with an adhesive taping material at a predetermined position between a release position of said yarns being held and an inlet opening of the case, and
cutting said yarns.

2. A method of collecting yarns according to claim 1, wherein the belt means is made into a cylindrical shape by introducing the belt means into a belt-rounding jig means.

3. A method of collecting yarns according to claim 1, wherein said yarns are pressed to the belt means by a yarn-pressing means at the side opposite to the belt means before said yarns move into the belt-rounding jig means together with the belt means.

4. A method of collecting yarns according to claim 1, wherein, after said yarns pass through a nozzle means while being substantially held by the belt means, the belt means turning to the side opposite to said yarns and unfolding to release said yarns.

5. A method of collecting yarns according to claim 1, wherein the belt means comprises an endless belt means.

6. A method of collecting yarns according to claim 1, wherein the predetermined distance is 5 to 200 cm.

7. A method of collecting yarns according to claim 1, said method further comprising the steps of:
exchanging the case loaded with the bundle with a new cylindrical case, and
starting the belt means to run again.

8. An apparatus for collecting and forming yarns into a bundle, comprising:
a feeding means for feeding said yarns, said yarns comprising 2,000 to 200,000 hollow fibers having a permselective wall,
a belt means for holding said yarns by being formed into a cylindrical shape, and which moves with said yarns for a predetermined distance while holding said yarns, and which then releases said yarns, and
a detector means for detecting that the released yarn bundle is moved and loaded into a cylindrical case, said detector means comprising a non-contact type detector.

9. An apparatus for collecting yarns according to claim 8, wherein the belt means comprises an endless belt means which is driven by a driving means.

10. An apparatus for collecting yarns according to claim 8, further comprising a cylindrical belt-rounding means for making the belt means into a cylindrical form, and a nozzle means through which the rounded belt means is passed with said yarns being held.

11. An apparatus for collecting yarns according to claim 8, further comprising a controller means for controlling and stopping the running belt means in response to an output by the detector means.

12. An apparatus for collecting yarns according to claim 8, further comprising a winding means for winding an adhesive tape around the yarn bundle at a predetermined position between a yarn releasing position and an inlet of the case, and a cutter means for cutting the bundle of yarns held together with the adhesive tape.

* * * * *